(12) United States Patent
Kim et al.

(10) Patent No.: US 11,856,283 B2
(45) Date of Patent: Dec. 26, 2023

(54) MULTI-MATCHING SENSING SYSTEM AND VEHICLE USING THE SAME

(71) Applicants: HYUNDAI MOTOR COMPANY, Seoul (KR); KIA CORPORATION, Seoul (KR)

(72) Inventors: Tae-Hyung Kim, Incheon (KR); Geun-Hyung Nam, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 310 days.

(21) Appl. No.: 17/500,333

(22) Filed: Oct. 13, 2021

(65) Prior Publication Data

US 2022/0286589 A1    Sep. 8, 2022

(30) Foreign Application Priority Data

Mar. 5, 2021  (KR) ........................ 10-2021-0029337

(51) Int. Cl.
| | |
|---|---|
| *H04N 23/57* | (2023.01) |
| *G01S 15/86* | (2020.01) |
| *G01S 15/931* | (2020.01) |
| *B60S 1/52* | (2006.01) |
| *B60S 1/56* | (2006.01) |
| *B60R 11/04* | (2006.01) |
| *B60Q 1/00* | (2006.01) |

(52) U.S. Cl.
CPC ............ *H04N 23/57* (2023.01); *G01S 15/86* (2020.01); *G01S 15/931* (2013.01); *B60Q 1/0023* (2013.01); *B60R 11/04* (2013.01); *B60S 1/52* (2013.01); *B60S 1/56* (2013.01); *G01S 2015/932* (2013.01)

(58) Field of Classification Search
CPC ....... H04N 23/57; G01S 15/86; G01S 15/931; G01S 2015/932; G01S 7/521; B60Q 1/0023; B60Q 1/2692; B60Q 2400/50; B60R 11/04; B60S 1/52; B60S 1/56
USPC .......................................... 348/148
See application file for complete search history.

(56) References Cited

U.S. PATENT DOCUMENTS

| | | | |
|---|---|---|---|
| 8,831,251 B2 * | 9/2014 | Oh .................. | H04R 3/007 381/123 |
| 2014/0354814 A1 * | 12/2014 | Han .................. | B60R 11/04 348/148 |
| 2020/0047708 A1 * | 2/2020 | Umezawa ........... | B60R 21/0134 |
| 2020/0062202 A1 * | 2/2020 | Umezawa ............ | B60R 21/38 |

FOREIGN PATENT DOCUMENTS

KR    10-2011-0010036 A    1/2011

* cited by examiner

*Primary Examiner* — Behrooz M Senfi
(74) *Attorney, Agent, or Firm* — Morgan, Lewis & Bockius LLP

(57) ABSTRACT

A multi-matching sensing system applied to a vehicle includes a rotation drum to which first, second and third pop-up modules pulled by electromagnetic attraction according to the supply of current and pushed by a spring restoring force of the spring are fixed to have angle relationship, a rotation device configured to rotate the rotation drum, and a multi-matching body holder having a connector connected to a wire harness in which a power line is formed with a transmission/reception circuit connected to each of the first, second and third pop-up modules and the rotation device.

20 Claims, 11 Drawing Sheets

FIG.2
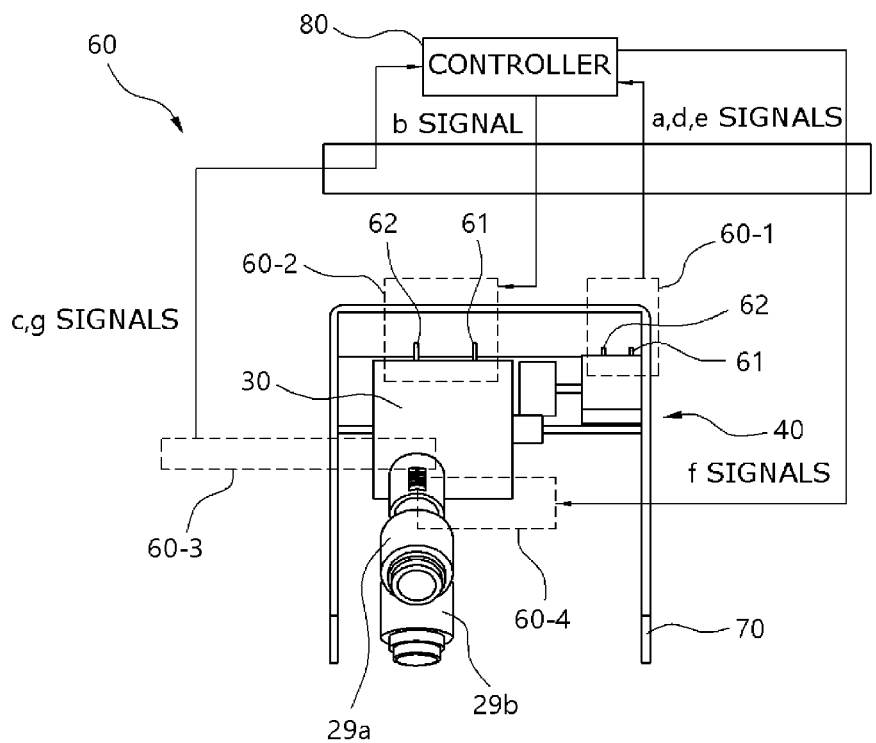
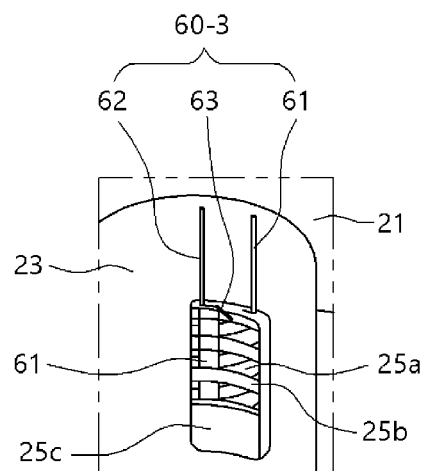
60-3 ENLARGED AND INTERNAL CONFIGURATION DIAGRAM
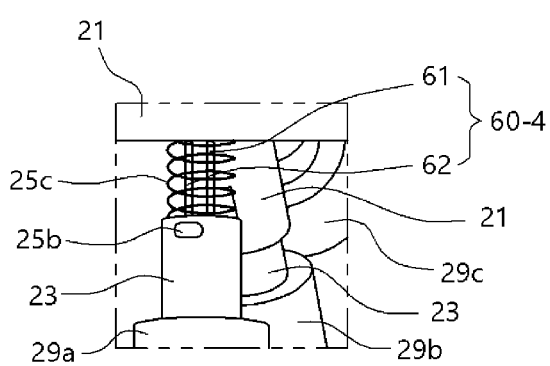
60-4 ENLARGED AND INTERNAL CONFIGURATION DIAGRAM FIG.3
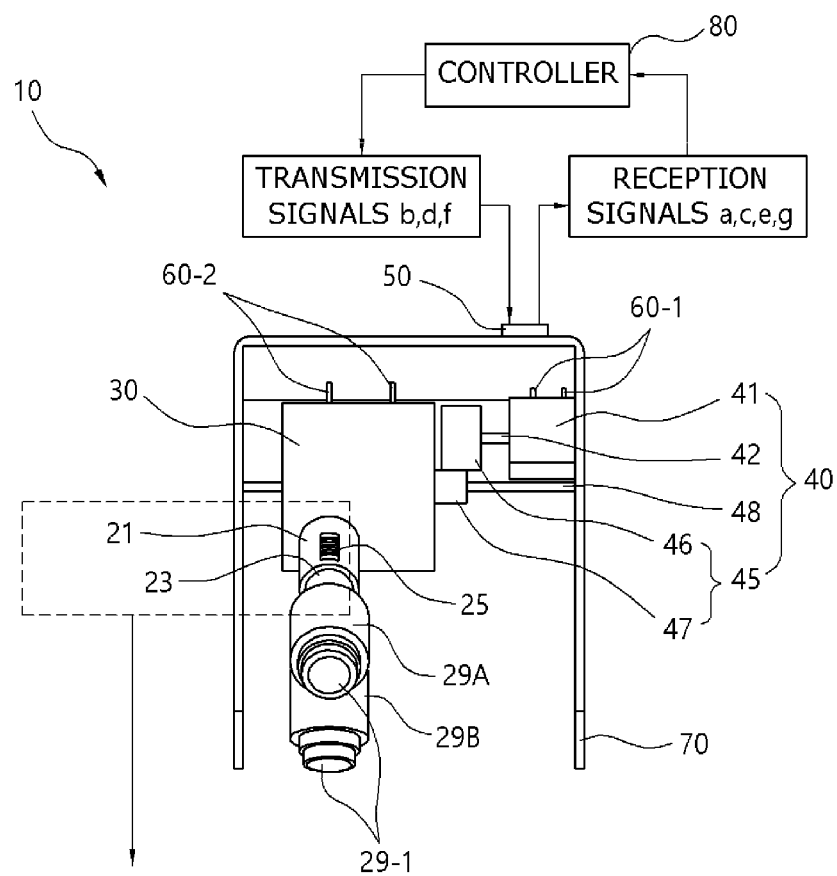
60: 60-1,60-2,60-3,60-4
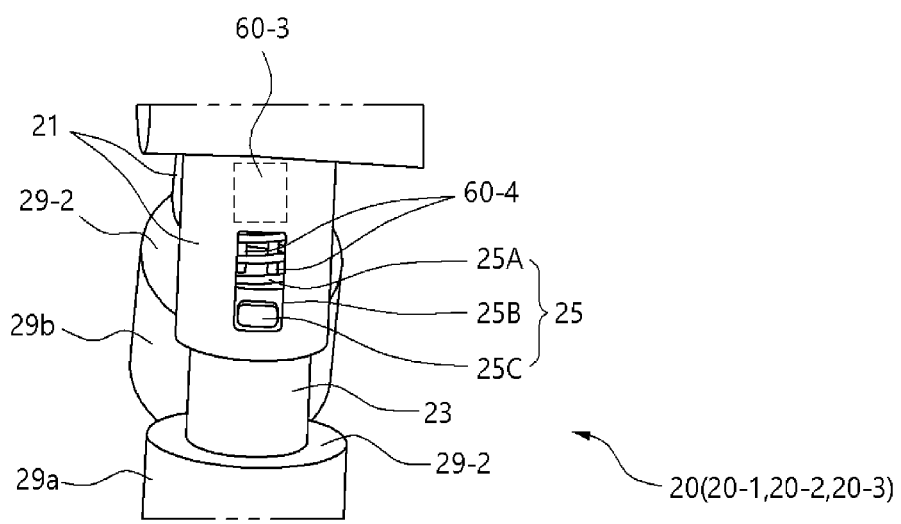

MULTI-MATCHING SENSING SYSTEM AND VEHICLE USING THE SAME

CROSS-REFERENCE TO RELATED APPLICATION

This application claims priority to Korean Patent Application No. 10-2021-0029337, filed on Mar. 5, 2021 which is incorporated herein by reference in its entirety.

TECHNICAL FIELD

Exemplary embodiments of the present disclosure relate to a sensing system, and particularly, to a vehicle to which a multi-matching sensing system in which each of sensor parts is matched with one hole based on rotation and location matching motions of a plurality of sensors or cameras or light sources with respect to one multi-matching sensor is applied.

BACKGROUND

Recently, in vehicles, the importance of an assistance system for increasing a function and performance for driving safety has been recognized. This affects an autonomous vehicle or a connected car.

For example, an advanced driver assistance system (ADAS) implements a system function for further increasing driving safety upon driving and assisting safe driving under a drowsiness or fog condition by being grafted onto a precise three-dimensional (3D) map database. Furthermore, a forward collision avoidance assist (FCA) implements a system function for autonomously reducing the speed of a vehicle if a driver does not step on the brake after a collision warning.

To this end, the vehicle generates sensing information of an ultrasonic/laser sensor, image information of a camera, sensing/image information of a LiDAR, etc., and provides the information to the ADAS, the FCA, etc.

For example, small sensor holes are perforated at a bumper or fender portion at the front of the vehicle, and the ultrasonic/laser sensor, the LiDAR, the camera, etc. are disposed within the sensor holes. Accordingly, necessary sensing/image information, etc. are provided to the ADAS, the FCA, etc. without degrading a vehicle design or outward beauty.

However, the sensor holes have a disadvantage in that the number of holes is also increased as the number of sensors is increased because a one-to-one matching method is applied to the holes and the sensors.

If only one part (i.e., sensor) is matched with one position (e.g., hole) outside the body as described above, exterior complexity is increased and a degree of freedom of the design is inevitably degraded because an additional hole is incorporated when multi-matching is necessary.

SUMMARY OF THE DISCLOSURE

An embodiment of the present disclosure is directed to providing a multi-matching sensing system and a vehicle using the same, wherein multiple sensors, cameras or light sources are assembled as a single multi-matching sensor and the multi-matching sensor is matched with a hole in a one-to-one way based on a rotation matching motion to implement a unique function, thereby enabling lighting for an emblem or a garnish and also variable external exposure without forming a plurality of holes that cause exterior complexity and degradation of outward beauty, in particular, by enabling each of the sensors of the multi-matching sensor to be matched at two or more other places according to circumstances at a specific location based on a location matching motion.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, a multi-matching sensing system includes a pop-up module including a moving housing configured to backward move by electromagnetic attraction according to magnetization of an electromagnet housing and to forward move by a spring restoring force of a pop-up member, and a matching housing configured to be separated from a sensing hole by a backward movement of the moving housing and to be matched with the sensing hole by a forward movement of the moving housing, wherein the pop-up module is divided as a group of first, second and third pop-up modules; a rotation drum to which the first pop-up module forming an angle of relationship $\beta$ with respect to a fixed location of the second pop-up module and the third pop-up module forming an angle of relationship $\alpha$ with respect to the fixed location of the second pop-up module in order to change a location where the pop-up module is matched with the sensing hole are fixed; a rotation device configured to rotate the rotation drum; a wire harness configured to supply a current to an transmission/reception circuit electrically connected to the pop-up module and the rotation device; and a multi-matching body holder configured to fix the rotation device and include a connector connected to the wire harness.

As a preferred embodiment, the electromagnet housing, the moving housing and the matching housing may be coupled in a straight line. The pop-up member may connect the electromagnet housing and the moving housing.

As a preferred embodiment, the pop-up member may include a spring disposed in an internal space of the electromagnet housing and configured to elastically support the moving housing, a guide slot grooved in an outer circumference surface of the electromagnet housing, and a stopper protruded from an outer circumference surface of the moving housing in a way to move in the guide slot. The guide slot may be configured to provide a stroke of the backward movement and the forward movement.

As a preferred embodiment, the matching housing may include a matching step. The matching step may be configured to remove a hole gap by being inserted into the sensing hole. The matching housing may include a steel ring. The steel ring may face the electromagnet housing to form the electromagnetic attraction.

As a preferred embodiment, the follower shaft of the rotation device may penetrate the rotation drum. The rotation drum may provide a path along which an electric wire B, electric wire C and electric wire D of the wire harness pass.

As a preferred embodiment, the rotation device may include a motor fixed to a side wall on one side of the multi-matching body holder and configured to generate a rotational force and a rotation gear configured to rotate the rotation drum by the rotational force. In this case, the rotation gear may include a drive gear provided in a drive shaft rotated by the motor and a driven gear provided in a driven shaft and engaged and rotated with the drive gear, wherein ends on both sides of the driven gear fixing the rotation drum may be fixed to side walls on both sides of the multi-matching body holder, respectively.

As a preferred embodiment, the wire harness may include an electric wire A electrically connected from the connector to the motor of the rotation device and configured to supply a current and detect motor information, an electric wire B electrically connected from the connector to the electromagnet housing and configured to supply a current generating the electromagnetic attraction, an electric wire C electrically connected from the connector to the electromagnet housing and configured to flow a current as a contact signal of the moving housing according to the backward movement and to block a current as a short-circuit signal of the moving housing according to the forward movement, and an electric wire D electrically connected from the connector to the matching housing and configured to supply a current to a sensor embedded in the matching housing.

As a preferred embodiment, the electric wire C may generate the contact signal and the short-circuit signal by using a contact switch.

As a preferred embodiment, the multi-matching body holder may be coupled to a bumper skin of a bumper in which the sensing hole is disposed.

As a preferred embodiment, each of the first, second and third pop-up modules may have a sensor embedded therein. A first matching housing of the first pop-up module, a second matching housing of the second pop-up module and a third matching housing of the third pop-up module may have different surface colors so that a color externally exposed through the sensing hole is different. In this case, the sensor may include a camera sensor, a parking assistance sensor and an ultrasonic sensor.

As a preferred embodiment, any one of the first, second and third pop-up modules may be composed of a non-function module to which a sensor is not applied. A surface color of a matching color housing of the non-function module may be identical with a color of a body in which the sensor hole is formed.

As a preferred embodiment, each of the first, second and third pop-up modules may be implemented as a light source lamp. The light source lamp may generate a lighting image for an emblem of a vehicle.

As a preferred embodiment, each of the first, second and third pop-up modules may be combined with any one of a mood light source, a sensor tube and a pictogram radiation device. The mood light source may be matched with the sensing hole. The sensor tube may be matched with a washing nozzle of a sensor washing device. The pictogram radiation device may generate a pictogram toward the outside of a vehicle.

As a preferred embodiment, each of the first, second and third pop-up modules may be combined with any one of a sensor and a pattern lens. The sensor may be matched with the sensing hole. The pattern lens may generate a lighting image of an emblem or a lighting image of a radiator grill.

As a preferred embodiment, each of the first, second and third pop-up modules may be combined with any one of a sensor, a camera and a pattern lens. The sensor may be matched with the sensing hole. The camera may play an image of a cluster image player back. The pattern lens may generate a lighting image toward the outside of a vehicle.

Furthermore, a vehicle includes a multi-matching sensing system including a rotation drum to which three first, second and third pop-up modules pulled by electromagnetic attraction according to a supply of current and pushed by a spring restoring force of a spring are fixed to have different angles of relationship, a rotation device configured to rotate the rotation drum, and a multi-matching body holder having a connector connected to a wire harness in which a power line is provided with a transmission/reception circuit connected to each of the first, second and third pop-up modules and the rotation device; a sensing hole surrounded by the multi-matching body holder, exposed to an outside, and individually matched with each of the first, second and third pop-up modules; and a controller configured to control the electromagnetic attraction, the rotation and sensors of the first, second and third pop-up modules by using a plurality of transmission/reception signals through the wire harness.

As a preferred embodiment, the controller may be configured to convert the plurality of transmission/reception signals into a plurality of reception signals and a plurality of transmission signals.

As a preferred embodiment, the reception signal a may be a motor rotation angle of the motor before the rotation device is driven. The reception signal c may be a switching connection signal indicating that each of the first, second and third pop-up modules is detached from the sensing hole. The reception signal e may be a motor rotation angle of the motor after the rotation device is driven. The reception signal g may be a switch short-circuit signal indicating that each of the first, second and third pop-up modules is matched with the sensing hole.

As a preferred embodiment, the transmission signal b may be a current that generates the electromagnetic attraction. The transmission signal d may be a current that drives a motor of the rotation device. The transmission signal f may be a current that drives the sensor embedded in each of the first, second and third pop-up modules.

BRIEF DESCRIPTION OF THE DRAWINGS

FIG. 2 is an example of a transmission/reception electrical circuit configuration using a wire harness for the multi-matching sensing system according to the present disclosure.

FIG. 3 illustrates a detailed configuration of a pop-up module, a rotation drum and a rotation device associated with the wire harness for the multi-matching sensing system according to the present disclosure.

DESCRIPTION OF SPECIFIC EMBODIMENTS

Figure 1:
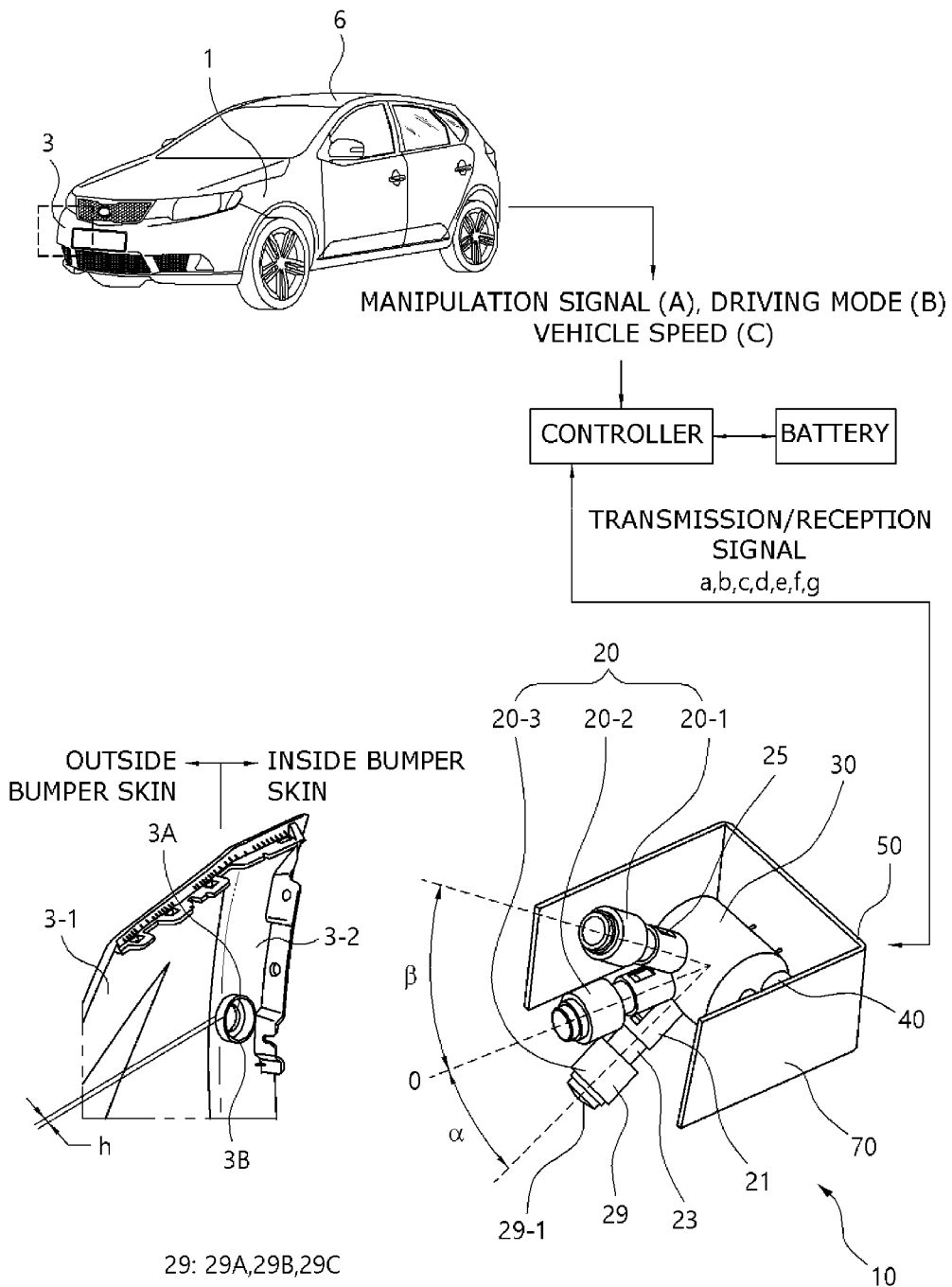
FIG. 1 illustrates an overall configuration of a multi-matching sensing system applied to a vehicle according to the present disclosure.

Exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Referring to FIG. 1, a vehicle 1 includes a multi-matching sensing system 10 to which a pop-up module 20 having first, second and third pop-up modules 20-1, 20-2, and 20-3 as one group is applied as a major element. In this case, the multi-matching sensing system 10 is mounted on the vehicle 1 by using a bumper 3, but may be disposed at various vehicle portions as in FIGS. 7 to 11.

In particular, the multi-matching sensing system 10 may implement at least three sensing functions in one sensing hole 3A by rotating using the three first, second and third pop-up modules 20-1, 20-2, and 20-3, having angles of relationship α and β, as one group. In this case, the angle of relationship α means a first angle of relationship formed by the third pop-up module 20-3 at a fixed location of the second pop-up module 20-2. The angle of relationship β means a second angle of relationship formed by the first pop-up module 20-1 at the fixed location of the second pop-up module 20-2.

Moreover, a characteristic in which the first and third pop-up modules 20-1 and 20-3 may be matched with different portions (refer to FIGS. 7 to 11) in the state in which the second pop-up module 20-2 has been matched with the sensing hole 3A is implemented. In this case, the number of first, second and third pop-up modules 20-1, 20-2, and 20-3 is illustrated as being three, but the number of angles of relationship that do not interfere with an operation in a 360° rotation section may be four or more.

Specifically, the multi-matching sensing system 10 is disposed inside the bumper 3 of the vehicle 1, and includes the pop-up module 20, a rotation drum 30, a rotation device 40, a connector 50, a wire harness 60 (refer to FIG. 2), a multi-matching body holder 70 and a controller 80.

For example, the pop-up module 20 is disposed in the inner space of the bumper skin 3-1 of the bumper 3, and includes three modules, divided into the first, second and third pop-up modules 20-1, 20-2, and 20-3, as one group by using an electromagnet housing 21, a moving housing 23, a pop-up member 25 and a matching housing 29 as the same element.

In particular, the electromagnet housing 21 is electromagnetically formed in the state in which the electromagnet housing 21 has been fixed to the rotation drum 30. The moving housing 23 is inserted into the electromagnet housing 21 and moves in a straight line along with the matching housing 29. The pop-up member 25 provides a spring elastic force. The matching housing 29 forms electromagnetic attraction along with the moving housing 23 by fixing the moving housing 23. As described above, the first, second and third pop-up modules 20-1, 20-2, and 20-3 are arranged on the same axis, and perform a reciprocating straight-line movement for a backward movement and a forward movement by the electromagnetic attraction and a spring restoring force. In this case, the forward movement is a direction in which the first, second and third pop-up modules 20-1, 20-2, and 20-3 approach the sensing hole 3A of the bumper skin 3-1 in a way to be closely attached thereto. In contrast, the backward movement is a direction in which the first, second and third pop-up modules 20-1, 20-2, and 20-3 become distant from the sensing hole 3A of the bumper skin 3-1 in a way to be detached therefrom.

Furthermore, the first, second and third pop-up modules 20-1, 20-2, and 20-3 are fixed to the rotation drum 30 at the angles of relationship α and β. The angles of relationship α and β are divided into an upward angle of relationship β formed by the first pop-up module 20-1 disposed on the upper side on the basis of the second pop-up module 20-2 and a downward angle of relationship α formed by the third pop-up module 20-3 disposed on the lower side on the basis of the second pop-up module 20-2. In this case, the second pop-up module 20-2 is determined to be a basis and matched with the sensing hole 3A, thus forming an initial operation state of the multi-matching sensing system 10.

In particular, each of the upward angle of relationship β and the downward angle of relationship α may be formed to be identically about 15°. Alternatively, the angles of relationship α and β may be set as different values. For example, the upward angle of relationship β may be formed to be about 20°, whereas the downward angle of relationship α may be formed to be about 15°. The reason for this is that vehicle portions toward which the first pop-up module 20-1 and the third pop-up module 20-3 are directed are different compared to the second pop-up module 20-2.

Therefore, the second pop-up module 20-2 forms the initial operation state of the multi-matching sensing system 10 because the second pop-up module 20-2 is determined to be a basis and matched with the sensing hole 3A. Each of the first, second and third pop-up modules 20-1, 20-2, and 20-3 is selectively matched with the one sensing hole 3A perforated in the bumper skin 3-1 upon rotation by the rotation drum 30.

To this end, the sensing hole 3A is a curved part of the bumper skin 3-1 and is perforated into an inner part 3-2 of the bumper skin 3-1 that forms the left/right side part of the bumper 3. Accordingly, an effect in that outward beauty is not degraded can be achieved because the sensing hole 3A is not exposed to the front of the vehicle 1.

In particular, the sensing hole 3A forms a hole jaw 3B by a matching height h protruding from the bumper skin 3-1. The hole jaw 3B surrounds the matching step 29-1 of the matching housing 29, thus contributing to preventing the spreading of light, etc. or an interference phenomenon attributable to a tolerance between the sensing hole 3A and the matching housing 29 upon sensing function of a sensor.

For example, the rotation drum 30 is composed of a hollow cylinder having an internal space and a circular cross section. The rotation drum 30 has one end of the electromagnet housing 21 coupled thereto and is integrated with each of the first, second and third pop-up modules 20-1, 20-2, and 20-3. In this case, the internal space of the rotation drum 30 forms a passage through which the wires −61 and +62 (refer to FIG. 3) of the wire harness 60 pass because the drive shaft 42 and driven shaft 48 (refer to FIG. 2) of the rotation device 40 penetrate or are fixed to the internal space of the rotation drum 30.

For example, the rotation device 40 is driven by power supplied in response to any one of transmission/reception signals a, b, c, d, e, f, and g of the controller 80, and rotates the rotation drum 30. The connector 50 is connected to the wire harness 60 (refer to FIG. 3) to which the transmission/reception signals a, b, c, d, e, f, and g of the controller 80 are input.

For example, the multi-matching body holder 70 has a "⌴" form. The multi-matching body holder 70 has a part of the wire harness 60 attached thereto while fixing the connector 50 through an opening part thereof and a rear wall on the side opposite to the opening part, and rotatably supports the gear shaft 48 (refer to FIG. 3) while fixing the motor 41 (refer to FIG. 3) of the rotation device 40 through a left/right side thereof.

For example, the controller 80 receives, as input information, a manipulation signal A, a driving mode B, a vehicle speed C, etc. detected by a manipulation button, a driving mode controller or a vehicle speed sensor (not illustrated). The controller 80 supplies or blocks power of a battery by using some of the transmission/reception signals a, b, c, d, e, f, and g, and receives or transmits control signals to or from the motor 41 of the rotation device 40 and the wire harness 60 (refer to FIG. 3) by using the remaining signals. In this case, the controller 80 may be a dedicated controller, but an engine control unit (ECU) or a motor control unit (MCU) may be applied to the controller 80.

FIGS. 2 and 3 illustrate constructions in which the pop-up module 20, the rotation device 40 and the connector 50 are associated with the controller 80 through the wire harness 60.

Referring to FIG. 2, the wire harness 60 includes an electric wire A 60-1 (or motor driving line), an electric wire B 60-2 (or module electromagnet line), an electric wire C 60-3 (or module switch line) and an electric wire D 60-4 (or module operation line). The wire harness 60 constructs an electrical circuit along with the controller 80 through the connector 50, exchanges the transmission signals b, d, and f and the reception signals a, c, e, and g with the controller 80, and is connected to power of the battery.

Specifically, each of the electric wires A 60-1, B 60-2, and D 60-4 includes a wire −61 and a wire +62, and forms a path for the supply of current of the battery and the transmission/reception signals of the controller 80. In contrast, the electric wire C 60-3 includes a wire −61, a wire +62, and a contact switch 63 that connects/disconnects the wire −61 and the wire +62. The electric wire C 60-3 generates signals for a backward movement and a forward movement for each of the first, second and third pop-up modules 20-1, 20-2, and 20-3 through a switch connection based on a current flow signal and a switch short-circuit based on a current block signal.

For example, the electric wire A 60-1 forms a connection from the connector 50 to the controller 80 and the motor 41 of the rotation device 40, so that the controller 80 receives motor location information of the motor 41 as the reception signal a and motor rotation information of the motor 41 as the reception signal e, whereas the controller 80 controls the driving of the motor 41 by transmitting a battery current to the motor 41 as the transmission signal d.

Furthermore, the electric wire B 60-2 forms a connection from the connector 50 to the controller 80 and the electromagnet housing 21 of the pop-up module 20 via the rotation drum 30, so that the controller 80 generates an electromagnetic force by transmitting a battery current to the electromagnet housing 21 as the transmission signal b.

In contrast, the electric wire C 60-3 forms a connection from the connector 50 to the controller 80 and the contact switch 63 provided in the electromagnet housing 21 of the pop-up module 20 via the rotation drum 30, so that the controller 80 checks the switch contact ON of the contact switch 63 based on the reception signal c, whereas the controller 80 checks the switch short-circuit OFF of the contact switch 63 based on the reception signal g. In this case, the switch contact ON is the state in which a battery current flows in the electric wire C 60-3. The switch short-circuit OFF is the state in which a battery current does not flow in the electric wire C 60-3.

Furthermore, the electric wire D 60-4 forms a connection from the connector 50 to a sensor (or camera) of the matching housing 29 via the rotation drum 30, the electromagnet housing 21 and the moving housing 23, so that the controller 80 supplies a battery current for a sensor operation ON as the transmission signal f.

FIG. 3 illustrates a detailed configuration in which the pop-up module 20 and the rotation device 40 are associated with the rotation drum 30, the connector 50, the wire harness 60, the multi-matching body holder 70 and the controller 80.

Specifically, in the pop-up module 20, the electromagnet housing 21 is fixed to the rotation drum 30. The moving housing 23 is inserted and connected to the rotation drum 30. The matching housing 29 is fixed to the moving housing 23 and forms a concentric circle in a serial coupling state. The pop-up member 25 limits a forward movement and a backward movement, that is, a moving distance of the matching housing 29, by connecting the electromagnet housing 21 and the moving housing 23. In this case, the moving housing 23 is illustrated as having a structure integrated with the matching housing 29, but may be configured to have a structure separated from the matching housing 29.

For example, the electromagnet housing 21 and the matching housing 29 generate electromagnetic attraction. To this end, the electromagnet housing 21 is connected to the electric wire B 60-2 of the wire harness 60 with it being fixed to the rotation drum 30. Accordingly, the electromagnet housing 21 is electromagnetically changed through a connection with power of the battery based on the transmission signal b that is output by the controller 80 and received through the connector 50. Furthermore, the matching housing 29 includes steel rings 29-2 at the front end of the matching step 29-1 and a rear end opposite to the front end, and faces the electromagnet housing 21.

Therefore, the electromagnet housing 21 generates an electromagnetic force by using a battery current flowing into the electric wire B 60-2. The electromagnetic force forms electromagnetic attraction force that pulls the steel ring 29-2, so that the matching housing 29 may backward move toward the electromagnet housing 21.

Furthermore, the electromagnet housing 21 and the matching housing 29 release electromagnetic attraction. To this end, the electromagnet housing 21 is connected to the electric wire C 60-3 of the wire harness 60 with it being fixed to the rotation drum 30, so that a backward movement of the matching housing 29 is checked based on the reception signal c transmitted to the controller 80 through the connector 50 and a forward movement of the matching housing 29 is checked based on the reception signal g transmitted to the controller 80 through the connector 50. In this case, the reception signal c is a contact signal of the electric wire C 60-3, and the reception signal g is a short-circuit signal of the electric wire C 60-3.

For example, the pop-up member 25 includes a spring 25A, a guide slot 25B and a stopper 25C. The spring 25A is disposed within an internal space of the electromagnet housing 21, and elastically supports the electromagnet housing 21 and the moving housing 23. The guide slot 25B is perforated into the electromagnet housing 21 in a rectangular form. The stopper 25C is composed of a rectangular protrusion protruding from one end of the moving housing 23 and is coupled to the guide slot 25B. In this case, a coil spring is applied to the spring 25A.

In particular, the spring 25A is compressed onto the moving housing 23 pulled when electromagnetic attraction acts, and then pushes the moving housing 23 by a spring restoring force when the electromagnetic attraction is released. Furthermore, the matching housing 29 forms a stroke of a forward/backward movement in the straight-line length of the guide slot 25B.

Therefore, the pop-up member 25 forms a reciprocating straight-line movement in the electromagnet housing 21, that is, in the state in which the moving housing 23 has been fixed, by the stroke of the guide slot 25B, thereby enabling a backward movement by which the matching housing 29 becomes distant from the sensing hole 3A (refer to FIG. 1) and a forward movement by which the matching housing 29 approaches the sensing hole 3A.

As described above, the pop-up member 25 has been described using the push-pull structure using the electromagnet (i.e., electromagnet housing 21) and the spring 25A for the straight-line motion of the moving housing 23, that is, a part matched with the pop-up member 25, but the straight-line motion may be changed into a straight-line motion using oil pressure depending on the type of vehicle and a condition of a peripheral device.

For example, the matching housing 29 is connected to the electric wire D 60-4 of the wire harness 60, and supplies power of the battery to a sensor (or camera) embedded in the matching housing 29. In this case, the electric wire D 60-4 is connected from the rotation drum 30 to the inside of the matching housing 29 via the electromagnet housing 21 and the moving housing 23.

In particular, the matching housing 29 is divided into a first matching housing 29A of the first pop-up module 20-1, a second matching housing 29B of the second pop-up module 20-2, and a third matching housing 29C of the third pop-up module 20-3, which have different colors. The reason for this is that an initial setting state can be checked based on one of the first, second and third pop-up modules 20-1, 20-2, and 20-3 disposed in the sensing hole 3A or one pop-up module that operates among the first, second and third pop-up modules 20-1, 20-2, and 20-3 can be checked with the naked eye.

Specifically, the rotation device 40 includes the motor 41 and a rotation gear 45.

For example, the motor 41 is fixed to a left sidewall of the matching body holder 70 and connected to the electric wire A 60-1 of the wire harness 60. Accordingly, the motor 41 transmits the reception signals a and e to the controller 80 through the connector 50, and is driven by the transmission signal d of the controller 80 received through the connector 50. In this case, the reception signal a is motor location information at timing before the motor 41 is driven. The reception signal e is motor rotation information at timing after the motor 41 is driven. The transmission signal d is a motor driving signal for rotating the motor.

In particular, the motor 41 has an angle-measuring sensor, such as a rotation type encoder, embedded therein and connected to the electric wire A 60-1. Accordingly, upon positioning, the angle-measuring sensor detects motor location information/motor rotation information of the reception signal a/e as motor angle position information and transmits the motor angle position information to the controller 80.

For example, the rotation gear 45 includes a drive gear 46 provided in the drive shaft 42 and a driven gear 47 provided in the driven shaft 48. The drive gear 46 and the driven gear 47 are engaged with each other and rotated together.

In particular, the drive shaft 42 has a right end fixed to the drive gear 46 in the state in which the left end of the drive shaft 42 has been fixed to the motor 41. Accordingly, the drive shaft 42 delivers a rotational force of the motor 41 to the drive gear 46. The rotation of the drive gear 46 is delivered to the driven gear 47 engaged with the drive gear 46.

In contrast, the driven shaft 48 has a left end rotatably supported by a left sidewall of the multi-matching body holder 70 in the state in which the driven shaft 48 has been fixed to the rotation drum 30, and has a right end, penetrating the rotation drum 30, rotatably supported by a right sidewall of the multi-matching body holder 70. Accordingly, the follower shaft 48 is rotated with the driven gear 47. The rotation of the driven shaft 48 also rotates the rotation drum 30.

Therefore, the drive shaft 42 and the driven shaft 48 are arranged in parallel. The driven gear 47 is welded to the side of the rotation drum 30, and can directly rotate the rotation drum 30.

Figure 4:
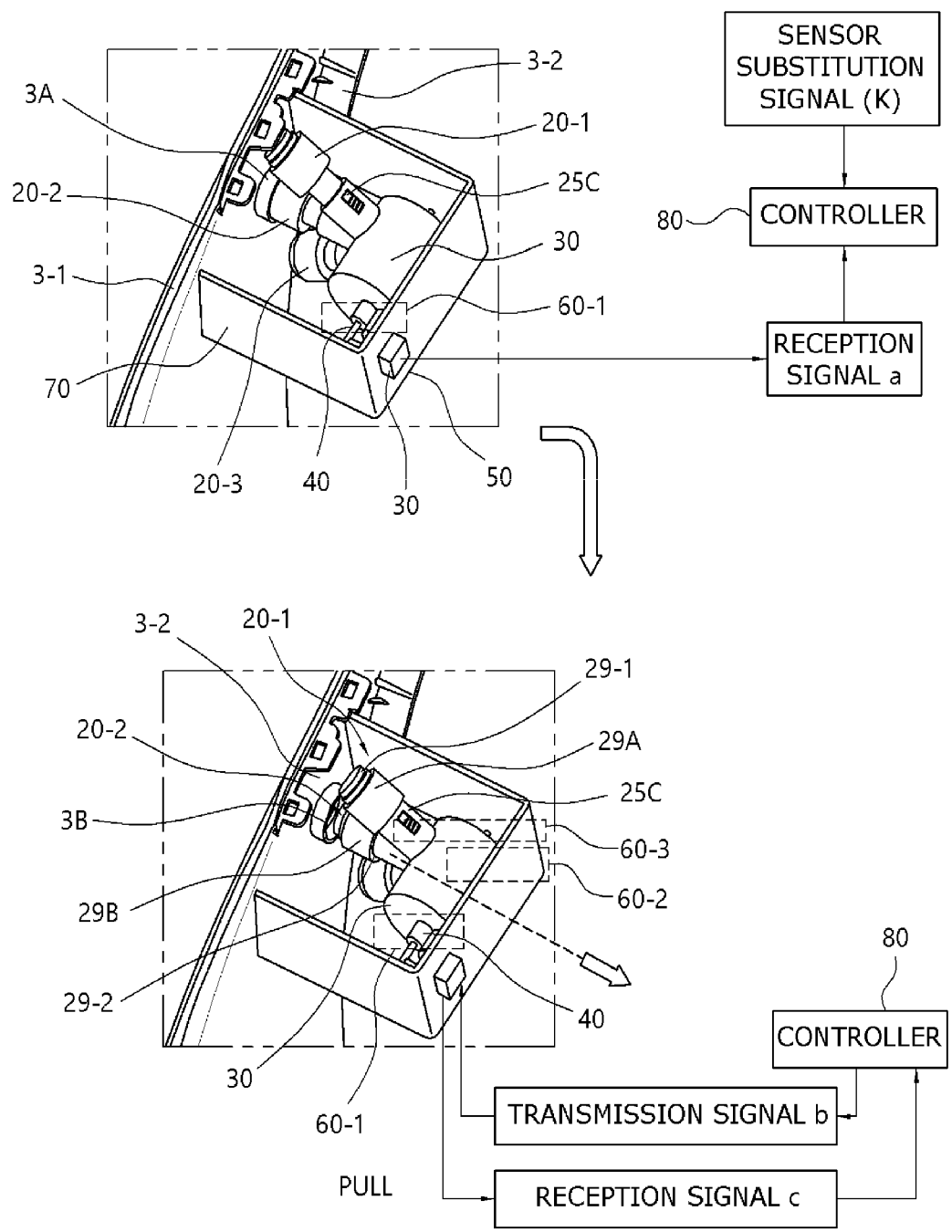
FIG. 4 illustrates an initial step state in which a sensor of the multi-matching sensing system according to the present disclosure is switched.
Figure 5:
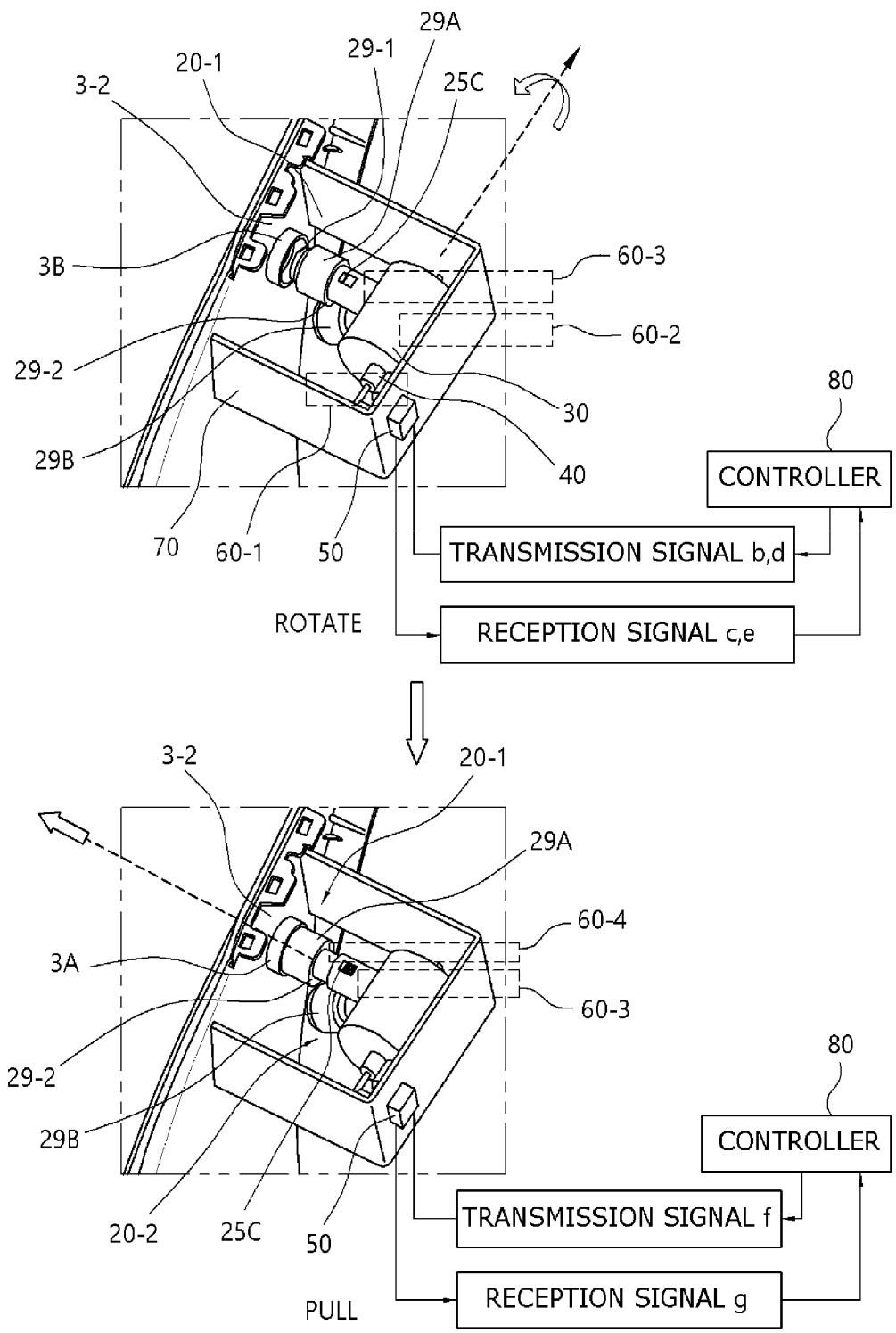
FIG. 5 illustrates intermediate and final step states subsequent to the initial step according to the present disclosure.
Figure 6:
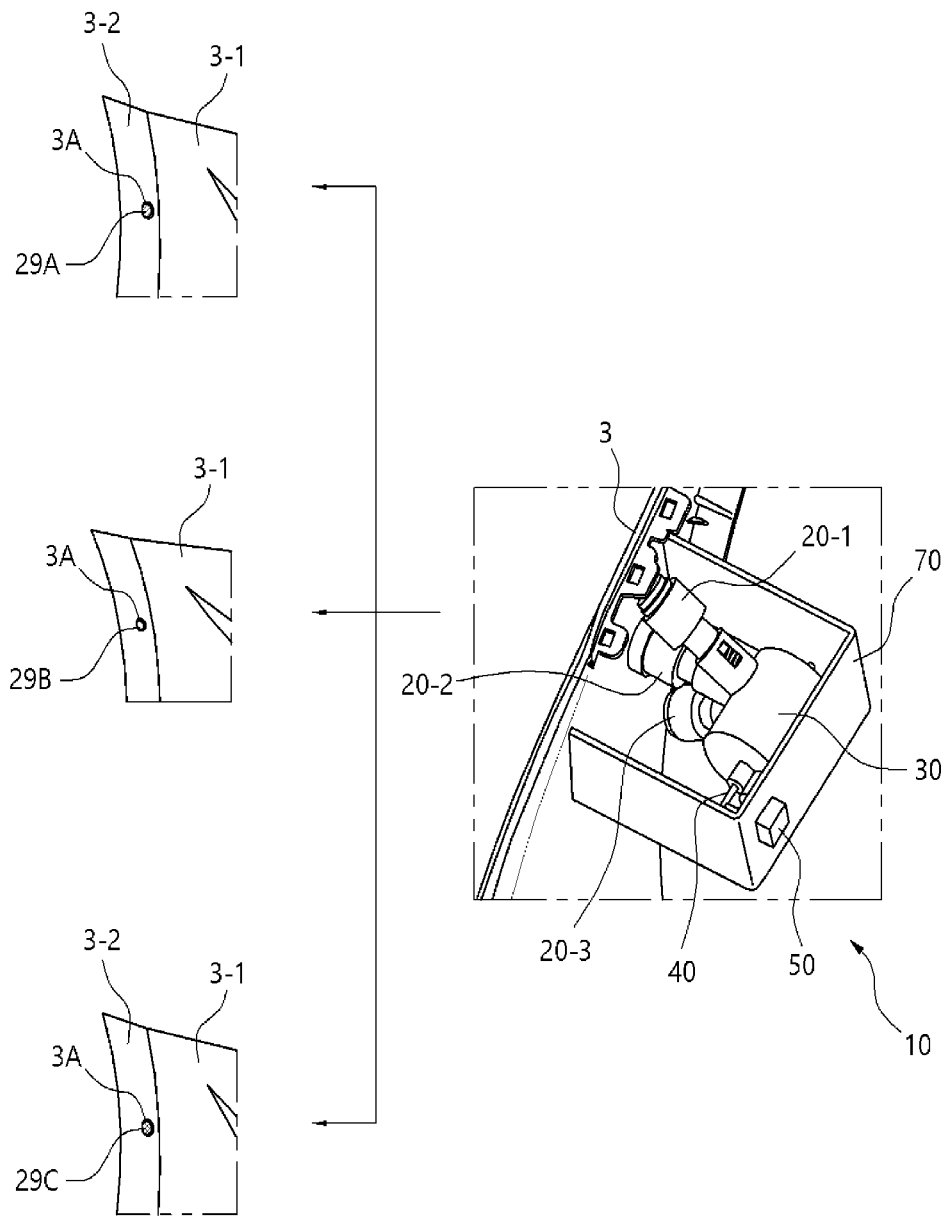
FIG. 6 is an example in which a plurality of sensors of the multi-matching sensing system according to the present disclosure is matched with one hole perforated into the bumper of a vehicle.

FIGS. 4 to 6 illustrate operations of the first, second and third pop-up modules 20-1, 20-2, and 20-3.

For example, in the first, second and third pop-up modules 20-1, 20-2, and 20-3, the second pop-up module 20-2 is described as a camera sensor function module, the first pop-up module 20-1 is described as a parking assistance sensor function module, and the third pop-up module 20-3 is described as an ultrasonic sensor function module.

For example, the controller 80 is described by performing a control operation as a program for recognizing a rotation angle 0° not having the angles of relationship α and β (refer to FIG. 1) as an initial setting location where the second pop-up module 20-2 is matched with the sensing hole 3A, recognizing a rotation angle β° of the upward angle of relationship β as an upward change location where the first pop-up module 20-1 is matched with the sensing hole 3A, and recognizing a rotation angle α° of the downward angle of relationship α as a downward change location where the third pop-up module 20-3 is matched with the sensing hole 3A.

Furthermore, a sensor substitution signal K may be a signal calculated by the controller 80 based on the manipulation button signal, the driving mode B or the vehicle speed C, but the manipulation button signal is applied to the sensor substitution signal K.

Referring to FIG. 4, when receiving the sensor substitution signal K, the controller 80 forms an electrical circuit through a connection between the electric wire A 60-1 and the battery, and checks the reception signal a from the electric wire A 60-1. In this case, the generation of the sensor substitution signal K is a situation in which a user presses a button, etc. in order to drive the parking assistance sensor of the first pop-up module 20-1 because the second pop-up module 20-2 is initially matched with the sensing hole 3A.

For example, the reception signal a is motor location information of the motor 41 in a current state. The motor location information includes a motor rotation angle of the angle-measuring sensor in the state in which the first matching housing 29A of the second pop-up module 20-2 has been matched with the sensing hole 3A.

Therefore, the controller 80 identifies that a target whose location will be changed at current timing is the second pop-up module 20-2 by checking that the motor rotation angle is 0°, and performs control for substituting the second pop-up module 20-2 with the first pop-up module 20-1.

Thereafter, the controller 80 forms an electrical circuit through a connection between the electric wire B 60-2 and the battery by outputting the transmission signal b to the electric wire B 60-2, so that a battery current flows into the electromagnet housing 21 of each of the first, second and third pop-up modules 20-1, 20-2, and 20-3. Accordingly, owning to an electromagnet characteristic of the electromagnet housing 21, an electromagnetic force is generated due to a current flow of the electric wire B 60-2. The electromagnetic force forms electromagnetic attraction along with the steel ring 29-2 provided in each of the first, second and third matching housings 29A, 29B, and 29C. As described above, the transmission signal b generates electromagnetic attraction by the generation of a magnetic force so that the moving housing 23 is moved toward a rear surface (i.e., toward the electromagnet housing).

Thereafter, each of the first, second and third matching housings 29A, 29B, and 29C is pulled by the electromagnetic attraction, and moves the moving housing 23. The movement of the moving housing 23 also moves the stopper 25C in the guide slot 25B of the pop-up member 25, so that the spring 25A brought into contact with the moving housing 23 is compressed and deformed.

Thereafter, in the state in which the moving housing 23 has moved to a maximum extent possible and backward moved due to the continuation of the electromagnetic attraction, the stopper 25C is disposed at the end of the guide slot 25B and connected to the contact switch 63 of the electric wire C 60-1. Accordingly, the connection of the contact switch 63 is a contact between the wire −61 and the wire +62, and transmits, to the controller 80, the reception signal c according to the switch contact ON.

Accordingly, the controller 80 recognizes that each of the first, second and third pop-up modules 20-1, 20-2, and 20-3 has backward moved and thus the first matching housing 29A of the second pop-up module 20-2 has exited from the sensing hole 3A, by recognizing the reception signal c.

Referring to FIG. 5, the controller 80 outputs the transmission signal d while maintaining the supply of current to the electric wire B 60-2 through the transmission signal b, so that a battery current flows into the motor 41 through an electrical circuit based on a connection between the electric wire A 60-1 and the battery. Accordingly, the motor 41 rotates the drive shaft 42. The drive gear 46 rotates the driven gear 47 by the rotation of the drive shaft 42, so that the rotation drum 30 fixed to the driven shaft 48 is rotated.

As a result, the rotation of the rotation drum 30 counterclockwise rotates all the first, second and third pop-up modules 20-1, 20-2, and 20-3. The counterclockwise rotation of the first, second and third pop-up modules 20-1, 20-2, and 20-3 lowers the locations of both the second pop-up module 20-2 and the first pop-up module 20-1, so that the first pop-up module 20-1 instead of the second pop-up module 20-2 is disposed in the sensing hole 3A. In this case, the rotation of the first pop-up module 20-1 is the rotation angle β° of the upward angle of relationship β, which is a value previously set by the controller 80.

Thereafter, the controller 80 identifies that the first pop-up module 20-1 has rotated normally at the rotation angle β° checked in the upward angle of relationship β included in the reception signal e and has been disposed in the sensing hole 3A, by checking motor rotation information again based on the reception signal e, and releases the supply of current to the electric wire A 60-1 due to the stop of the transmission signal d.

Finally, the controller 80 stops the output of the transmission signal b, so that the spring 25A of the pop-up member 25 pushes the moving housing 23 again by a spring restoring force due to the release of the supply of current to the electric wire B 60-2. The pushing of the moving housing 23 forward moves the first matching housing 29, so that the first pop-up module 20-1 is disposed in the sensing hole 3A. The controller 80 recognizes such a situation as the reception signal g (i.e., contact switch short-circuit OFF).

Accordingly, in the first, second and third pop-up modules 20-1, 20-2, and 20-3, the location of the second pop-up module 20-2 is changed into the location of the first pop-up module 20-1, so that the location of the first pop-up module 20-1 is matched with the sensing hole 3A.

Thereafter, the controller 80 flows a battery current into the electric wire D 60-4 through the transmission signal f so that the second pop-up module 20-2 operates in the state in which the disconnection of a signal through the electric wire C 60-3 has been checked.

FIG. 6 illustrates an example in which external visibility is different due to a difference between colors of the first, second and third matching housings 29A, 29B, and 29C constituting the first, second and third pop-up modules 20-1, 20-2, and 20-3 in the multi-matching sensing system 10.

FIG. 6 illustrates a case where the first matching housing 29A has a surface color of purple, the second matching housing 29B has a surface color of yellow, and the third matching housing 29C has a surface color of red.

Accordingly, when the first pop-up module 20-1 is matched with the sensing hole 3A of the bumper skin 3-1, the purple of the first matching housing 29A is contrasted with the blue of the bumper skin 3-1. This corresponds to the parking assistance sensor function of the first pop-up module 20-1, thereby being capable of making the purple externally recognized that the vehicle 1 is now parked.

Furthermore, when the second pop-up module 20-2 is matched with the sensing hole 3A of the bumper skin 3-1, the yellow of the second matching housing 29B is contrasted with the blue of the bumper skin 3-1. This corresponds to the camera sensor function of the second pop-up module 20-2, thereby being capable of making the yellow externally recognized that the vehicle 1 now photographs surrounding images during driving.

Furthermore, when the third pop-up module 20-3 is matched with the sensing hole 3A of the bumper skin 3-1, the red of the third matching housing 29C is contrasted with the blue of the bumper skin 3-1. This corresponds to the ultrasonic sensor function of the third pop-up module 20-3, thereby being capable of making the red externally recognized that the vehicle 1 now performs ultrasonic scanning on a surrounding object during driving.

As described above, the multi-matching sensing system 10 can secure more effective external visibility in addition to a unique function implementation of the first, second and third pop-up modules 20-1, 20-2, and 20-3 by applying different colors to the first, second and third matching housings 29A, 29B, and 29C.

FIGS. 7 to 11 illustrate examples in which the multi-matching sensing system 10 is applied to various portions of the vehicle 1. In this case, functions of the first, second and third pop-up modules 20-1, 20-2, and 20-3 may be applied to the parking assistance, camera, and ultrasonic sensing functions, respectively, or may be changed into two sensing functions and one body color matching function, two sensing functions and one lighting function or three lighting functions.

In particular, FIGS. 7 to 11 illustrate that the multi-matching sensing system 10 can obtain various external effects through the leaking of light to a gap around a part matched by being combined with a light source (e.g., mood light source 90A), such as a color change garnish, an emblem, or a LiDAR (or radar) washing device, in addition to the ultrasonic sensor and the camera.

Figure 7:
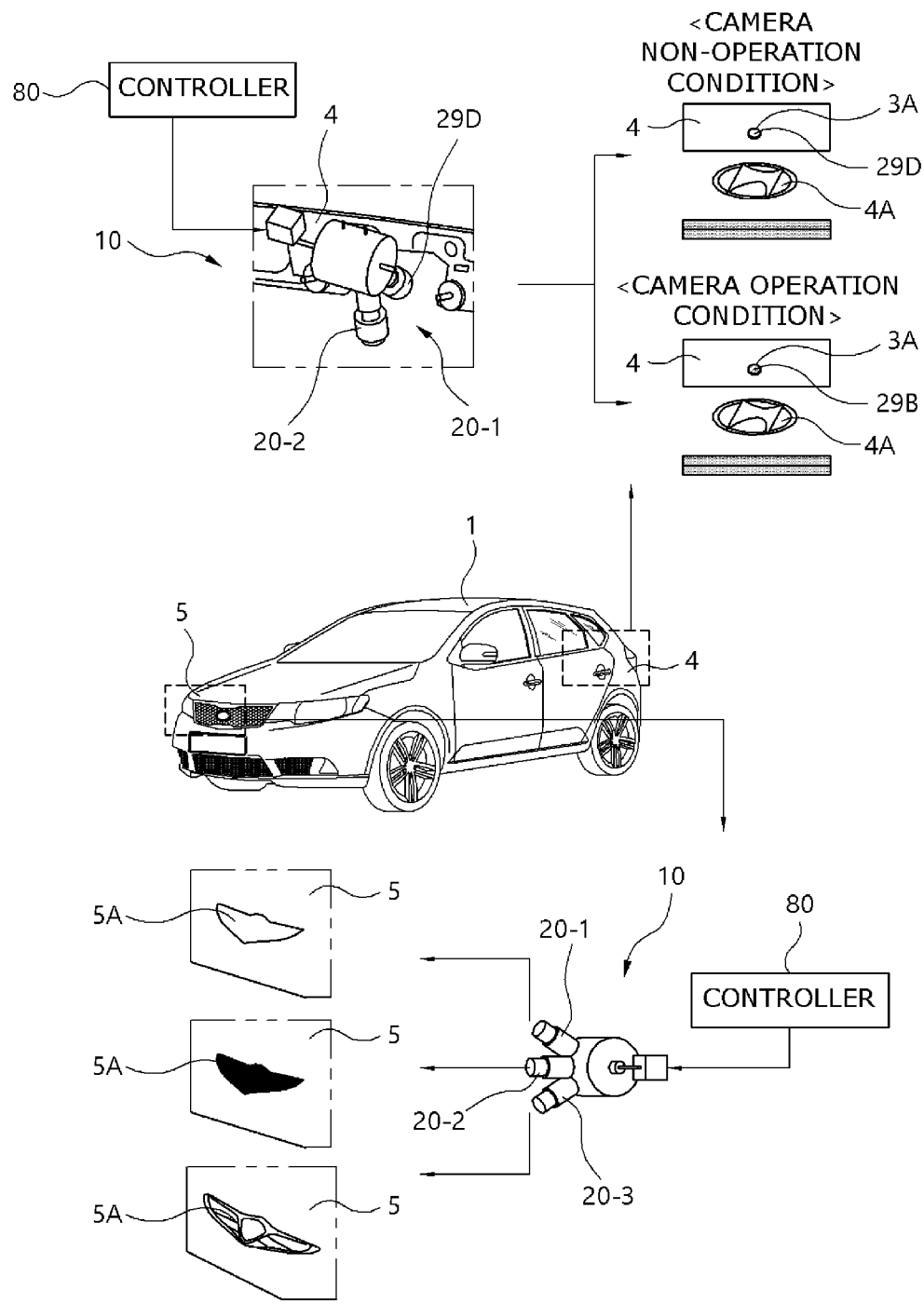
FIG. 7 is an example in which a color of the multi-matching sensing system according to the present disclosure is coordinated with the surroundings of a vehicle or the multi-matching sensing system is applied to emblem coloring.

In a trunk lid 4 of FIG. 7, the first pop-up module 20-1 of the first, second and third pop-up modules 20-1, 20-2, and 20-3 is set as a non-functional part, a matching color housing 29D in which the surface color of the first matching housing 29A has been matched with a body color of the trunk lid 4 is applied, the second pop-up module 20-2 is set as the camera function, and the third pop-up module 20-3 is set as the ultrasonic function. In this case, the first pop-up module 20-1 is the non-functional part and does not require the supply of power thereto. Accordingly, the electric wire C 60-3, etc. is not applied, enabling structural simplification.

Therefore, since the first pop-up module 20-1 is the non-functional part, the parking assistance sensor and the ultrasonic sensor may be applied to the second and third pop-up modules 20-2 and 20-3.

Accordingly, when the first pop-up module 20-1 of the first, second and third pop-up modules 20-1, 20-2, and 20-3 is disposed in the sensing hole 3A perforated in the trunk lid 4 having a logo 4A thereon, the matching color housing 29D stops the black hole of the sensing hole 3A by a body color of the trunk lid 4. Accordingly, the degradation of outward beauty occurring because the black hole of the sensing hole 3A perforated in the trunk lid 4 is contrasted with the body color of the trunk lid 4 can be prevented.

In contrast, when the second pop-up module 20-2 of the first, second and third pop-up modules 20-1, 20-2, and 20-3 is disposed in the sensing hole 3A, yellow, that is, the surface color of the second matching housing 29B, is contrasted with a body color of the trunk lid 4. This corresponds to the camera sensor function, thereby being capable of making externally recognized that the vehicle 1 now photographs surrounding images during driving.

In a hood 5 of FIG. 7, the first, second and third pop-up modules 20-1, 20-2, and 20-3 have different emission colors. Accordingly, the first pop-up module 20-1 may generally change lighting of an emblem 5A into white lighting, the second pop-up module 20-2 may generally change lighting of the emblem 5A into blue lighting, and the third pop-up module 20-3 may partially change lighting of the emblem 5A into pink lighting, in contrast with a body color of the hood 5 having the emblem 5A thereon.

Therefore, each of the first, second and third pop-up modules 20-1, 20-2, and 20-3 may be implemented as a light source lamp.

Figure 8:
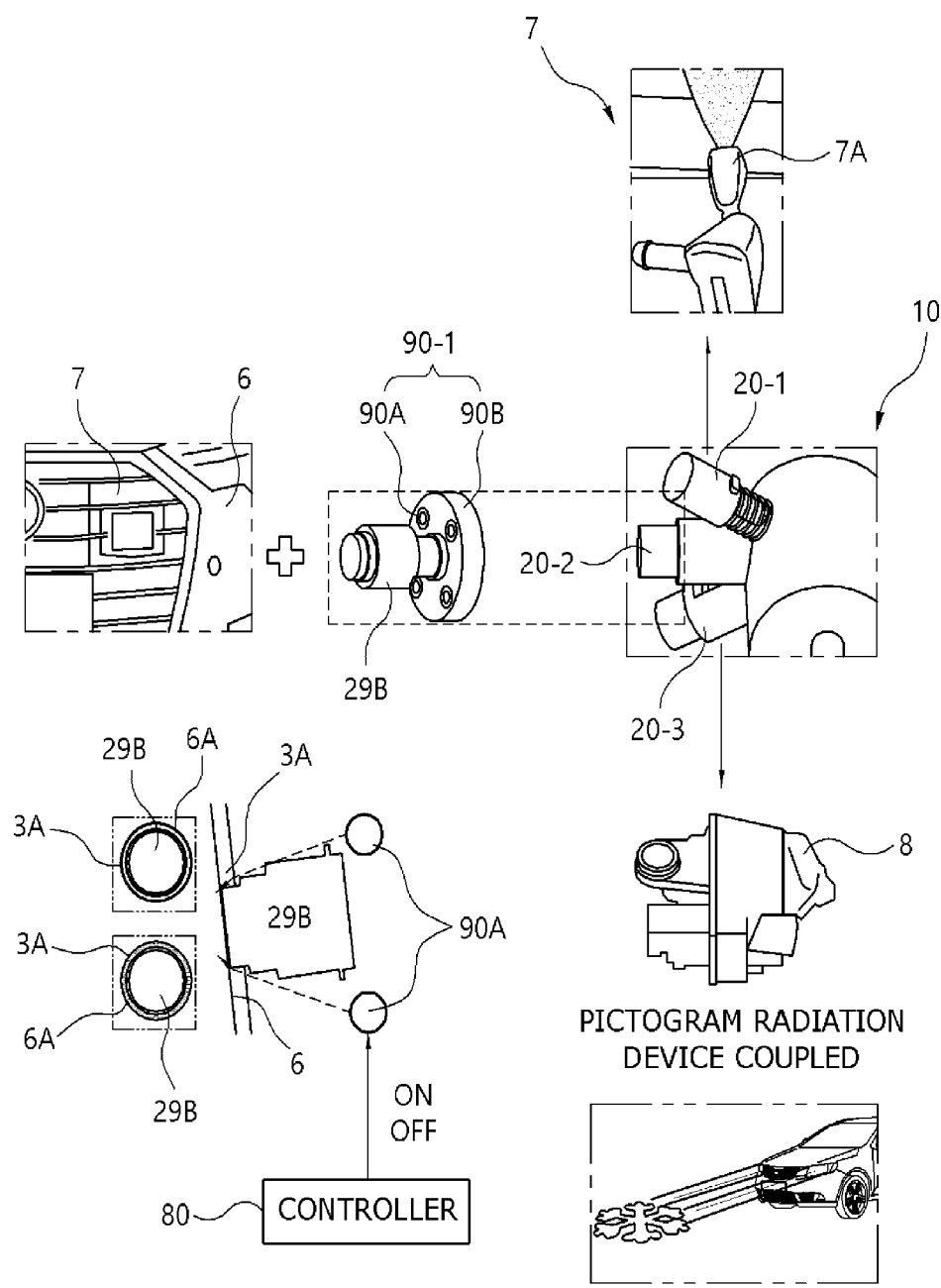
FIG. 8 is an example in which the multi-matching sensing system according to the present disclosure is used for the lighting of a hole mood lamp, the coupling of a pictogram radiation device, and the coupling of a washing device in association with an interior light source.

In a side panel 6 of FIG. 8, each of the first, second and third pop-up modules 20-1, 20-2, and 20-3, together with the one sensing hole 3A, is associated with a sensor washing device 7 and a pictogram radiation device 8. In this case, the sensor washing device 7 is applied to a LiDAR or a radar. The pictogram radiation device 8 generates a pictogram, that is, a symbol letter that indicates a thing, a facility, a behavior, a concept, etc. as a symbolized pictograph so that an unspecified number of people can rapidly and easily empathize with the pictogram.

For example, the second pop-up module 20-2 of the first, second and third pop-up modules 20-1, 20-2, and 20-3 may have a light source bracket 90-1 and may be matched with the sensing hole 3A of the side panel 6. The first pop-up module 20-1 of the first, second and third pop-up modules 20-1, 20-2, and 20-3 may be matched with the sensor washing device 7. The third pop-up module 20-3 may be matched with the pictogram radiation device 8.

Therefore, the parking assistance sensor or the ultrasonic sensor may be applied to the second pop-up module 20-2. Each of the first and third pop-up modules 20-1 and 20-3 may be implemented as a light source lamp.

To this end, the light source bracket 90-1 includes a light source plate 90B coupled to the moving housing 23 of the second pop-up module 20-2 and a plurality of mood light sources 90A disposed in the light source plate 90B at equal intervals to form a circle.

Accordingly, in the state in which the second pop-up module 20-2 has been matched with the sensing hole 3A, the second pop-up module 20-2 can shed lighting of the mood light sources 90A through a gap between the sensing hole 3A and the matching step 29-1 of the second matching housing 29B. Such a lighting effect contributes to improving outward beauty along with the improvement of external visibility.

In particular, the mood light sources 90A can generate a warning lighting effect for the outside along with a mood lighting effect for a color by surrounding the sensing hole 3A with a lighting ring 6A, having a lighting effect, in a circular color and changing a color of the lighting ring 6A into blue or red.

Furthermore, in the state in which the second pop-up module 20-2 has been matched with the sensing hole 3A, the first pop-up module 20-1 may illuminate a portion of the washing nozzle 7A toward the sensor washing device 7, and the third pop-up module 20-3 may generate various pictograms to the outside of the vehicle 1 toward the pictogram radiation device 8.

Figure 9:
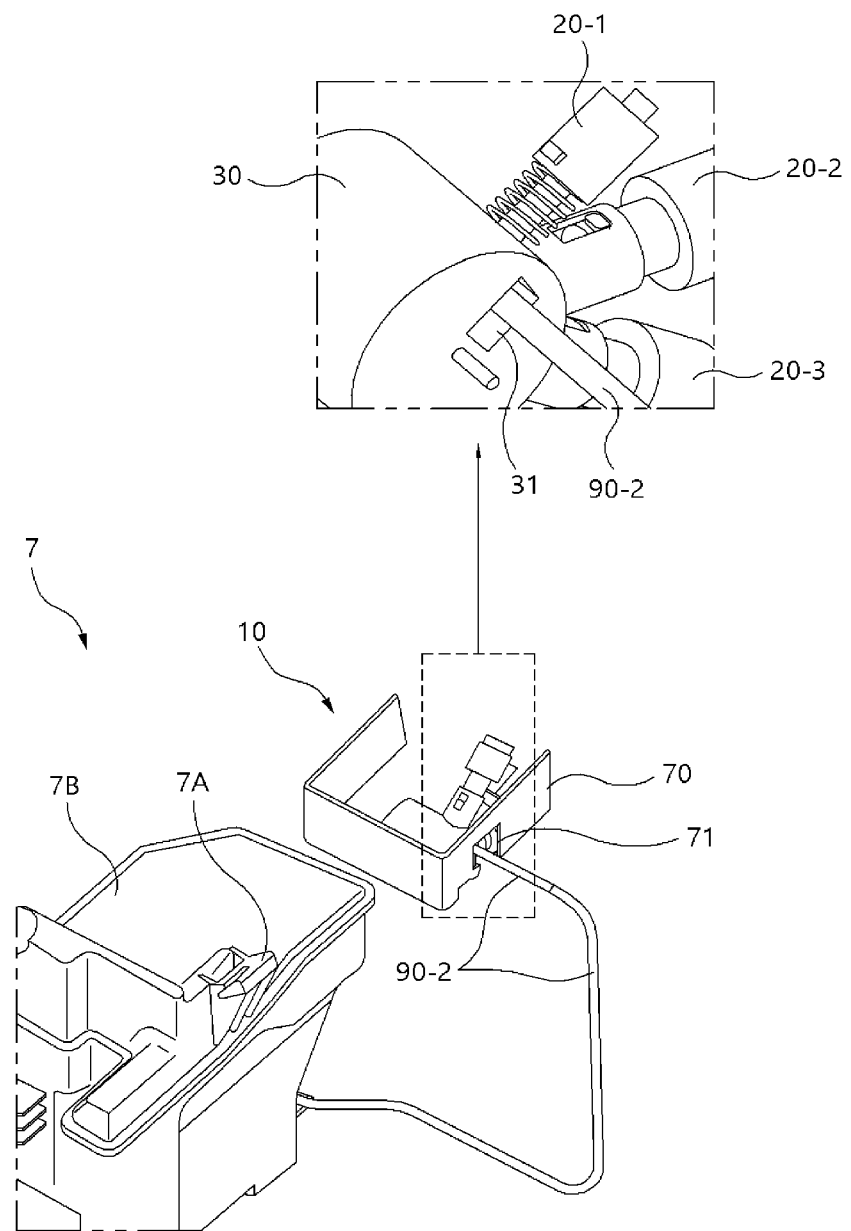
FIG. 9 illustrates a configuration associated with a sensor washing device according to the present disclosure.

FIG. 9 is an example in which the first pop-up module 20-1 is matched with the sensor washing device 7. The first pop-up module 20-1 includes the electromagnet housing 21, the moving housing 23 and a sensor tube 90-2 positioned as the matching housing 29A. In this case, the sensor tube 90-2 may be a light tube that provides guidance of a light source.

For example, the sensor tube 90-2 exits to a housing slit 31 perforated into the side of the rotation drum 30 and a holder slit 71 perforated into the side of the multi-matching body holder 70, and is connected to a washing nozzle 7A assembled with the washing bracket 7B of the sensor washing device 7.

Therefore, in the multi-matching sensing system 10, a structural change may be performed on the rotation drum 30 and the multi-matching body holder 70, and the electric wires C and D 60-3 and 60-4 may be removed from the structure of the first pop-up module 20-1 based on a use of the sensor tube 90-2 while maintaining the structures of the second and third pop-up modules 20-2 and 20-3 without any change.

Figure 10:
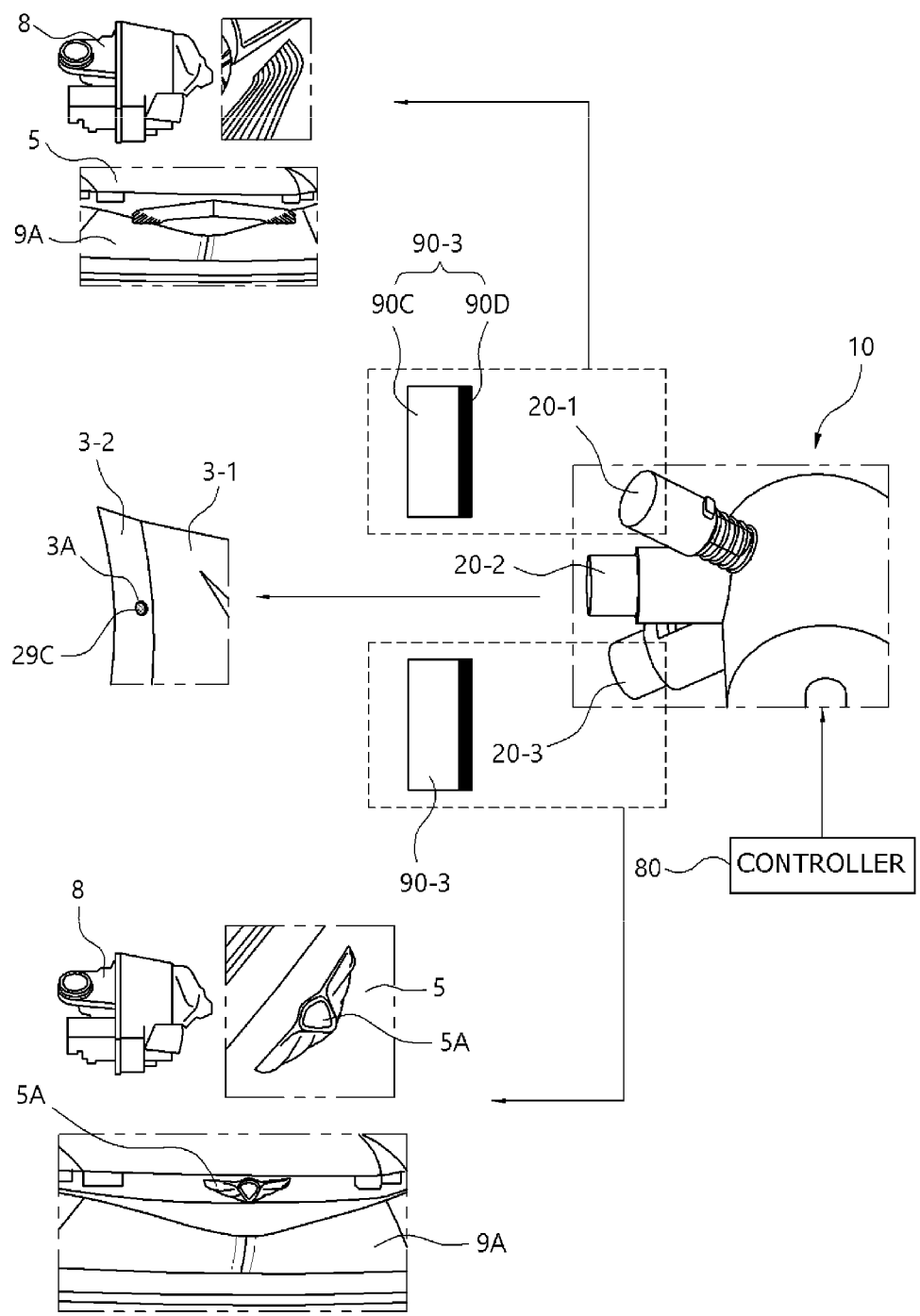
FIG. 10 is an example in which the multi-matching sensing system according to the present disclosure is used for an image transform-external implementation of a vehicle by a combination of various lens patterns of a light source radiation unit.

FIG. 10 is an example in which the second pop-up module 20-2 is matched with the sensing hole 3A and each of the first and third pop-up modules 20-1 and 20-3 is matched with the pictogram radiation device 8 and the emblem 5A of the hood 5 in association with a pattern lens 90-3.

Therefore, since each of the first and third pop-up modules 20-1 and 20-3 is implemented as a light source lamp, the parking assistance sensor or the ultrasonic sensor may be applied to the second pop-up module 20-2.

For example, the pattern lens 90-3 includes a transparent plate 90C and a transmissive film 90D that transmit a light source. The transparent plate 90C forms a lighting image by forming various optic patterns. The transmissive film 90D is attached to the back of the transparent plate 90C, and transmits a light source toward the transparent plate 90C. In this case, the transparent plate 90C is a transparent material. Polycarbonate (PC) or acryl may be applied to the transparent plate 90C.

Accordingly, in the state in which the second pop-up module 20-2 has been matched with the sensing hole 3A, the first pop-up module 20-1 illuminates a portion of a radiator grill 9A by using a lighting image that passes through the pattern lens 90-3 toward the radiator grill 9A. The third pop-up module 20-3 generates various pictograms in which lighting images passing through the pattern lens 90-3 toward the pictogram radiation device 8 are combined, with respect to a road in front of the vehicle 1.

In particular, if the pattern lens 90-3 is composed of a lens having various patterns and changed, the pattern lens 90-3 may variably implement a grill image, etc. of the radiator grill 9A.

Figure 11:
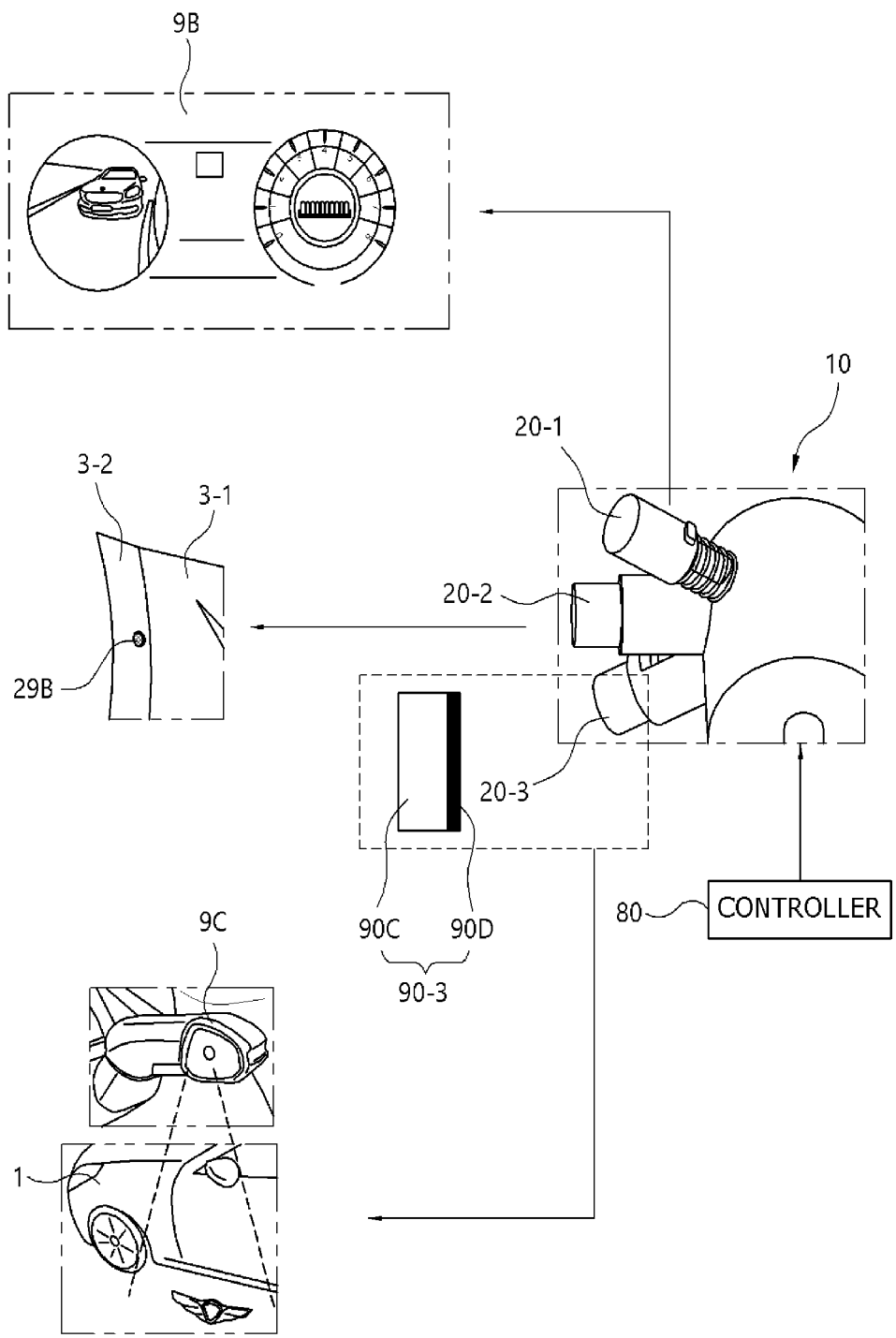
FIG. 11 is an example in which the multi-matching sensing system according to the present disclosure is used for the coupling of various images of a puddle lamp and a camera of a vehicle.

FIG. 11 is an example in which the second pop-up module 20-2 is matched with the sensing hole 3A, the first pop-up module 20-1 is associated with a cluster image player 9B in order to generate a rear camera image, and the third pop-up module 20-3 is associated with a puddle lamp 9C on the side of a vehicle in order to generate a lighting image or a pictogram with respect to a road surface under a door of the vehicle 1.

Therefore, the camera may be applied to the first pop-up module 20-1. The parking assistance sensor or the ultrasonic sensor may be applied to the second pop-up module 20-2. Each of the third pop-up modules 20-1 and 20-3 may be implemented as a light source lamp.

For example, the cluster image player 9B is a player that is disposed in a cluster forming the driver's seat of the vehicle 1 and that plays an image back. Furthermore, the pattern lens 90-3 is the same as the pattern lens 90-3 of FIG. 10 because the pattern lens 90-3 includes the transparent plate 90C and the transmissive film 90D.

Accordingly, in the state in which the second pop-up module 20-2 has been matched with the sensing hole 3A, the first pop-up module 20-1 transmits a rear camera image to the cluster image player 9B toward the cluster. The third pop-up module 20-3 generates a lighting image, passing through the pattern lens 90-3 toward the puddle lamp 9C, with respect to a road surface under a door of the vehicle 1.

As described above, the multi-matching sensing system 10 applied to the vehicle 1 according to the present embodiment includes the rotation drum 30 in which the first, second and third pop-up modules 20-1, 20-2, and 20-3 pulled by electromagnetic attraction according to the supply of current and pushed by a spring restoring force of the spring 25A are fixed to have the angles of relationship α and β, the rotation device 40 configured to rotate the rotation drum 30, and the multi-matching body holder 70 equipped with the connector 50 connected to the wire harness 60 in which power lines are formed with transmission/reception circuits connected to the first, second and third pop-up modules 20-1, 20-2, and 20-3 and the rotation device 40. The controller 80 controls the electromagnetic attraction, the rotation and the sensors of the first, second and third pop-up modules 20-1, 20-2, and 20-3 by using the transmission/reception signals a, b, c, d, e, f, and g through the wire harness 60. Accordingly, exterior complexity and the degradation of outward beauty can be prevented because multiple sensing parts are applied to one hole. In particular, a matching motion not having a gap between the hole and the sensor, which degrades sensing performance, can be performed because each of the sensing parts matched with the one hole is moved toward the hole and closely attached to the hole.

The multi-matching sensing system applied to a vehicle according to the present disclosure implements the following effects.

First, a required sensing function can be selectively operated because the plurality of sensors/cameras/light sources is assembled with one multi-matching sensor and each of the sensors is matched with the one hole according to a matching motion.

Second, a clean image through a reduced hole outside a bumper can be implemented because the one hole is formed in a bumper cover and various function parts are exposed and operated according to circumstances. In particular, a situation in which other specifications have to be given up in order to apply one specification due to a restriction to the place where a plurality of holes will be formed can be solved because matching holes for each part for a function/image multi-change are not incorporated.

Third, several sensing functions can be integrated and provided and a differentiated image in the vehicle can be provided because a camera/ultrasonic sensor, that is, function parts of an advanced driver assistance system (ADAS), and an image radiation device, that is, an external display part, are variably exposed to the external appearance of the vehicle.

Fourth, a matching motion not having a gap between the hole and the sensor, which degrades sensing performance, can be performed because each of the sensing parts assembled as the multi-matching sensor and matched with the one hole is moved toward the hole and closely attached to the hole.

Fifth, a portion of the vehicle using the multi-matching sensor can be changed in color along with the ultrasonic sensor and the sensing unit of the camera, and may be extended to a garnish, an emblem, a LiDAR (or radar) washing unit, etc.

Sixth, each of the sensors of the multi-matching sensor can be matched with two or more other places according to circumstances at a specific location through a location matching motion. Accordingly, color lighting for an emblem or a garnish can be performed, and external exposure can be variably implemented.

Seventh, an external effect can be obtained because the light source provided in the multi-matching sensor enables lighting by radiating light to a gap around a matching part. In particular, the lens having various patterns can be changed and can also variably implement a grill image because the light source is disposed at the back of the transmissive film in which a hole is not formed.

While the present disclosure has been described with respect to the specific embodiments, it will be apparent to those skilled in the art that various changes and modifications may be made without departing from the spirit and scope of the disclosure as defined in the following claims.

What is claimed is:

1. A multi-matching sensing system comprising:
a pop-up module comprising a moving housing configured to backward move by electromagnetic attraction according to magnetization of an electromagnet housing and to forward move by a spring restoring force of a pop-up member, and a matching housing configured to be separated from a sensing hole by a backward movement of the moving housing and to be matched with the sensing hole by a forward movement of the moving housing, wherein the pop-up module is divided as a group of first, second and third pop-up modules;

a rotation drum to which the first pop-up module forming a second angle of relationship with respect to a fixed location of the second pop-up module and the third pop-up module forming a first angle of relationship with respect to the fixed location of the second pop-up module in order to change a location where the pop-up module is matched with the sensing hole are fixed;
a rotation device configured to rotate the rotation drum;
a wire harness configured to supply a current to a transmission/reception circuit electrically connected to the pop-up module and the rotation device; and
a multi-matching body holder configured to fix the rotation device and comprising a connector connected to the wire harness.

2. The multi-matching sensing system of claim 1, wherein the pop-up member comprises:
a spring disposed in an internal space of the electromagnet housing and configured to elastically support the moving housing,
a guide slot grooved in an outer circumference surface of the electromagnet housing, and
a stopper protruded from an outer circumference surface of the moving housing in a way to move in the guide slot.

3. The multi-matching sensing system of claim 2, wherein the guide slot is configured to provide a stroke of the backward movement and the forward movement.

4. The multi-matching sensing system of claim 1, wherein:
the matching housing comprises a matching step, and
the matching step is configured to remove a hole gap by being inserted into the sensing hole.

5. The multi-matching sensing system of claim 4, wherein:
the matching housing comprises a steel ring, and
the steel ring faces the electromagnet housing to form the electromagnetic attraction.

6. The multi-matching sensing system of claim 1, wherein:
a driven shaft of the rotation device penetrates the rotation drum, and
the rotation drum provides a path along which an electric wire B, electric wire C and electric wire D of the wire harness pass.

7. The multi-matching sensing system of claim 1, wherein the rotation device comprises:
a motor fixed to a side wall on one side of the multi-matching body holder and configured to generate a rotational force, and
a rotation gear configured to rotate the rotation drum by the rotational force.

8. The multi-matching sensing system of claim 7, wherein the rotation gear comprises:
a drive gear provided in a drive shaft rotated by the motor, and
a driven gear provided in a driven shaft and engaged and rotated with the drive gear, wherein ends on both sides of the driven gear fixing the rotation drum are fixed to side walls on both sides of the multi-matching body holder, respectively.

9. The multi-matching sensing system of claim 1, wherein the wire harness comprises:
an electric wire A electrically connected from the connector to a motor of the rotation device and configured to supply a current and detect motor information,
an electric wire B electrically connected from the connector to the electromagnet housing and configured to supply a current generating the electromagnetic attraction,
an electric wire C electrically connected from the connector to the electromagnet housing and configured to flow a current as a contact signal of the moving housing according to the backward movement and to block a current as a short-circuit signal of the moving housing according to the forward movement, and
an electric wire D electrically connected from the connector to the matching housing and configured to supply a current to a sensor embedded in the matching housing.

10. The multi-matching sensing system of claim 9, wherein the electric wire C generates the contact signal and the short-circuit signal by using a contact switch.

11. The multi-matching sensing system of claim 1, wherein the multi-matching body holder is coupled to a bumper skin of a bumper in which the sensing hole is disposed.

12. The multi-matching sensing system of claim 1, wherein:
each of the first, second and third pop-up modules has a sensor embedded therein, and
a first matching housing of the first pop-up module, a second matching housing of the second pop-up module and a third matching housing of the third pop-up module have different surface colors so that a color externally exposed through the sensing hole is different.

13. The multi-matching sensing system of claim 12, wherein the sensor includes a camera sensor, a parking assistance sensor and an ultrasonic sensor.

14. The multi-matching sensing system of claim 1, wherein:
any one of the first, second and third pop-up modules is composed of a non-function module to which a sensor is not applied, and
a surface color of a matching color housing of the non-function module is identical with a color of a body in which the sensor hole is formed.

15. The multi-matching sensing system of claim 1, wherein:
each of the first, second and third pop-up modules is implemented as a light source lamp, and
the light source lamp generates a lighting image for an emblem of a vehicle.

16. The multi-matching sensing system of claim 1, wherein:
each of the first, second and third pop-up modules is combined with any one of a mood light source, a sensor tube and a pictogram radiation device,
the mood light source is matched with the sensing hole,
the sensor tube is matched with a washing nozzle of a sensor washing device, and
the pictogram radiation device generates a pictogram toward an outside of a vehicle.

17. The multi-matching sensing system of claim 1, wherein:
each of the first, second and third pop-up modules is combined with any one of a sensor and a pattern lens,
the sensor is matched with the sensing hole, and
the pattern lens generates a lighting image of an emblem or a lighting image of a radiator grill.

18. The multi-matching sensing system of claim 1, wherein:

each of the first, second and third pop-up modules is combined with any one of a sensor, a camera and a pattern lens, the sensor is matched with the sensing hole, the camera plays an image of a cluster image player back, and the pattern lens generates a lighting image toward an outside of a vehicle.

19. A vehicle comprising:

a multi-matching sensing system comprising a rotation drum to which first, second and third pop-up modules pulled by electromagnetic attraction according to a supply of current and pushed by a spring restoring force of a spring are fixed to have different angles of relationship, a rotation device configured to rotate the rotation drum, and a multi-matching body holder having a connector connected to a wire harness in which a power line is provided with a transmission/reception circuit connected to each of the first, second and third pop-up modules and the rotation device;

a sensing hole surrounded by the multi-matching body holder, exposed to an outside, and individually matched with each of the first, second and third pop-up modules; and a controller configured to control the electromagnetic attraction, the rotation and sensors of the first, second and third pop-up modules by using a plurality of transmission/reception signals through the wire harness.

20. The vehicle of claim 19, wherein the controller is configured to convert the plurality of transmission/reception signals into a plurality of reception signals and a plurality of transmission signals.

* * * * *